US008203550B2

(12) United States Patent
Imura et al.

(10) Patent No.: US 8,203,550 B2
(45) Date of Patent: Jun. 19, 2012

(54) PLASMA DISPLAY AND METHOD FOR DRIVING PLASMA DISPLAY PANEL

(75) Inventors: Hisafumi Imura, Yokohama (JP); Kenichi Yamamoto, Higashimurayama (JP)

(73) Assignee: Hitachi, Ltd., Tokyo (JP)

( * ) Notice: Subject to any disclaimer, the term of this patent is extended or adjusted under 35 U.S.C. 154(b) by 741 days.

(21) Appl. No.: 12/412,013

(22) Filed: Mar. 26, 2009

(65) Prior Publication Data

US 2009/0303218 A1 Dec. 10, 2009

(30) Foreign Application Priority Data

Jun. 4, 2008 (JP) ................................ 2008-147485

(51) Int. Cl.
*G06F 3/038* (2006.01)

(52) U.S. Cl. ........................................ 345/211; 345/63

(58) Field of Classification Search ........................ None
See application file for complete search history.

(56) References Cited

U.S. PATENT DOCUMENTS 6,538,392 B2 3/2003 Kanazawa
6,924,795 B2 8/2005 Kawasaki et al.
2002/0021265 A1 2/2002 Ishii et al.
2004/0201552 A1 10/2004 Onozawa et al.
2007/0046580 A1 3/2007 Kwon

FOREIGN PATENT DOCUMENTS

| | | |
|---|---|---|
| JP | 2801893 | 9/1998 |
| JP | 2003-271089 | 9/2003 |
| JP | 2004-309983 | 11/2004 |
| KR | 10-0612383 | 8/2006 |
| KR | 10-0708712 | 4/2007 |
| KR | 10-0766659 | 10/2007 |

OTHER PUBLICATIONS

Korean Office Action issued in Korean Patent Application No. 10-2009-0027769, mailed Nov. 12, 2010.

*Primary Examiner* — Paul Huber
(74) *Attorney, Agent, or Firm* — McDermott Will & Emery LLP

(57) ABSTRACT

A disclosed plasma display includes a plasma display panel including cells and display electrodes including a group of X electrodes and a group of Y electrodes; an X electrode driving circuit configured to apply a sustaining pulse to the group of X electrodes; and a Y electrode driving circuit configured to apply a sustaining pulse to the group of Y electrodes. One of the X electrode driving circuit and the Y electrode driving circuit applies a low-voltage sustaining pulse that can cause the sustaining discharge by itself to a corresponding one of the group of X electrodes and the group of Y electrodes. The other one of the X electrode driving circuit and the Y electrode driving circuit applies a high-voltage sustaining pulse that can cause the sustaining discharge by itself to the other one of the group of X electrodes and the group of Y electrodes.

16 Claims, 11 Drawing Sheets

PLASMA DISPLAY AND METHOD FOR DRIVING PLASMA DISPLAY PANEL

BACKGROUND OF THE INVENTION

1. Field of the Invention

A certain aspect of the present invention relates to a plasma display and a method for driving a plasma display panel.

2. Description of the Related Art

Plasma displays have become widely used as alternatives of cathode ray tube (CRT) displays. Plasma displays are self-luminous and therefore provide good visibility, are capable of displaying information at high speed, and are suitable for applications such as a thin display with a large screen. Display methods of plasma displays include a non-interlaced (progressive) method where all display lines are displayed in one field and an interlace method where an odd field displaying odd display lines and an even field displaying even display lines are displayed alternately.

For example, Japanese Patent Application Publication No. 2004-309983 discloses an interlace method called an alternate lighting of surface (ALIS) method. In related-art plasma displays, each display line is formed by a pair of display electrodes (X and Y electrodes). Meanwhile, in the ALIS method, display lines are formed between all adjacent X and Y electrodes.

In the ALIS method, multiple electrode driving circuits are provided separately for the X electrodes and the Y electrodes. For example, a first electrode driving circuit applies a sustaining pulse to odd electrodes and a second electrode driving circuit applies a sustaining pulse to even electrodes. The sustaining pulse applied to the odd electrodes and the sustaining pulse applied to the even electrodes have opposite phases. When sustaining pulses are applied to the X and Y electrodes in discharge spaces called cells, sustaining discharge occurs and the cells are caused to emit light. The cells form pixels of a plasma display panel.

As disclosed in Japanese Patent No. 2801893, the ALIS method makes it possible to form twice as many display lines as in a related-art method with the same number of display electrodes. In other words, the ALIS method makes it possible to form the same number of display lines with half as many display electrodes as in the related art method.

FIG. 10 shows driving waveforms and a light emission waveform in a related-art plasma display. As shown by FIG. 10 (*d*), each subfield period includes a reset period for uniformly initializing the charge distribution of the screen, an address period for selecting cells according to display information, and a sustaining period for displaying an image by causing cells to emit light by applying sustaining pulses for a number of times corresponding to the luminance of the cells. Driving voltages are applied to address electrodes and the X and Y electrodes during the reset period, the address period, and the sustaining period as shown by FIG. 10 (*a*) through (*c*), and as a result, a light emission waveform as shown by FIG. 10 (*e*) is generated.

FIG. 11 shows exemplary sustaining pulses in a related-art plasma display. As shown in FIG. 11, a simple-rectangular sustaining pulse Ps having an amplitude Vs(x) or an amplitude Vs(y) is applied alternately to the X electrodes and the Y electrodes to drive the plasma display panel. Vs(x) and Vs(y) indicate the same voltage Vs. Thus, the X electrodes and the Y electrodes are alternately biased temporarily to the voltage Vs. In other words, a pulse train is applied alternately to the X electrodes and the Y electrodes. The voltage Vs is called a sustaining discharge voltage and is the difference between a panel base potential (normally, ground level: GND) and a panel bias potential. The sustaining discharge voltage Vs is set at a value within a discharge driving margin. During the sustaining period, the sustaining pulse Ps with the same voltage is applied alternately to the X electrodes and the Y electrodes during the sustaining period. As a result, the polarity of the X electrodes and the Y electrodes switches in turn, sustaining discharge occurs in alternate directions, and the cells are caused to emit light.

The surface of each cell is covered by a protective layer made of, for example, an MgO film to protect the X and Y electrodes. The protective layer is damaged because high-voltage sustaining pulses are applied during the sustaining period and ions accumulate as the sustaining discharge is repeated. Japanese Patent Application Publication No. 2003-271089, for example, discloses a technology to reduce the ion bombardment on the MgO film. In the disclosed technology, a sustaining voltage applied to the X electrodes is set at a value lower than a sustaining voltage applied to the Y electrodes to lower the potential difference between the X and Y electrodes when the Y electrodes are negative. This configuration makes it possible to reduce the instantaneous discharge intensity and thereby to reduce the damage on the protective layer.

With the configuration described with reference to FIG. 11, because the sustaining pulses applied to the X and Y electrodes have the same voltage, it is necessary to apply high-voltage sustaining pulses to both of the X and Y electrodes to cause sustaining discharge. This in turn increases the load and the temperature of a driving circuit and also increases the power consumption and costs of a driving circuit.

In the technology disclosed in Japanese Patent Application Publication No. 2003-271089, the sustaining voltage applied to the X electrodes is lowered only slightly to reduce the damage on the protective layer. Therefore, an X sustaining circuit for driving the X electrodes must have substantially the same voltage resistance as that of a Y sustaining circuit for driving the Y electrodes. Accordingly, this configuration also increases the costs of driving circuits.

SUMMARY OF THE INVENTION

Aspects of the present invention provide a plasma display and a method for driving a plasma display panel that solve or reduce one or more problems caused by the limitations and disadvantages of the related art.

According to an aspect of the present invention, a plasma display includes a plasma display panel including cells and display electrodes including a group of X electrodes and a group of Y electrodes; an X electrode driving circuit configured to apply a sustaining pulse to the group of X electrodes; and a Y electrode driving circuit configured to apply a sustaining pulse to the group of Y electrodes. The X electrode driving circuit and the Y electrode driving circuit are configured to apply the sustaining pulses to the display electrodes to cause sustaining discharge for a number of times corresponding to luminance of the cells to be caused to emit light and thereby to form an image on the plasma display panel. One of the X electrode driving circuit and the Y electrode driving circuit is configured to apply a low-voltage sustaining pulse with a peak value not large enough to cause the sustaining discharge by itself to one of the group of X electrodes and the group of Y electrodes. The other one of the X electrode driving circuit and the Y electrode driving circuit is configured to apply a high-voltage sustaining pulse with a peak value large enough to cause the sustaining discharge by itself to the other one of the group of X electrodes and the group of Y electrodes. In a predetermined time period, the X electrode driving circuit and the Y electrode driving circuit are configured to apply the low-voltage sustaining pulse and the high-voltage sustaining pulse at the same time to the corresponding display electrodes.

Another aspect of the present invention provides a method of driving a plasma display panel including cells and display electrodes including a group of X electrodes and a group of Y electrodes where sustaining pulses are applied to the display electrodes to cause sustaining discharge for a number of times corresponding to luminance of the cells to be caused to emit light and thereby to form an image on the plasma display panel. The method includes the steps of applying a low-voltage sustaining pulse with a peak value not large enough to cause the sustaining discharge by itself to one of the group of X electrodes and the group of Y electrodes; and applying a high-voltage sustaining pulse with a peak value large enough to cause the sustaining discharge by itself to the other one of the group of X electrodes and the group of Y electrodes. In a predetermined time period, the low-voltage sustaining pulse and the high-voltage sustaining pulse are applied at the same time to the corresponding display electrodes.

DESCRIPTION OF THE PREFERRED EMBODIMENTS

Preferred embodiments of the present invention are described below with reference to the accompanying drawings.

Figure 1:
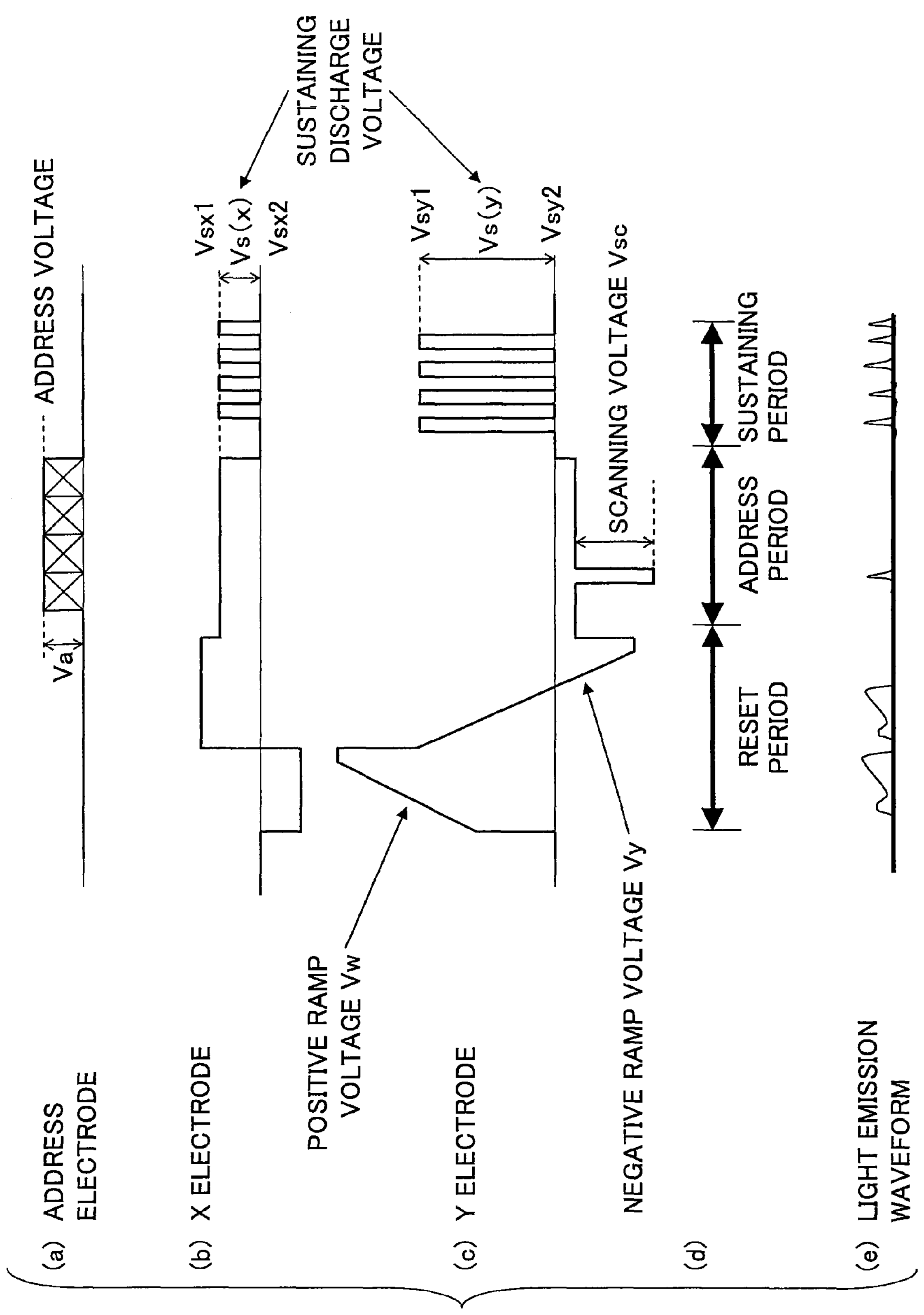
FIG. 1 is a drawing illustrating examples of driving waveforms and a light emission waveform in a plasma display and a plasma display panel driving method according to an embodiment of the present invention.

FIG. 1 is a drawing illustrating examples of driving waveforms and a light emission waveform for one subfield in a plasma display and a plasma display panel driving method according to an embodiment of the present invention. FIG. 1 (*a*) shows a driving waveform of an address electrode. FIG. 1 (*b*) shows a driving waveform of an X electrode. FIG. 1 (*c*) shows a driving waveform of a Y electrode. FIG. 1 (*d*) shows a configuration of one subfield period. FIG. 1 (*e*) shows a light emission waveform of a cell. Below, for descriptive purposes, address electrodes, X electrodes, and Y electrodes may be referred to both in singular forms and plural forms.

Figure 10:
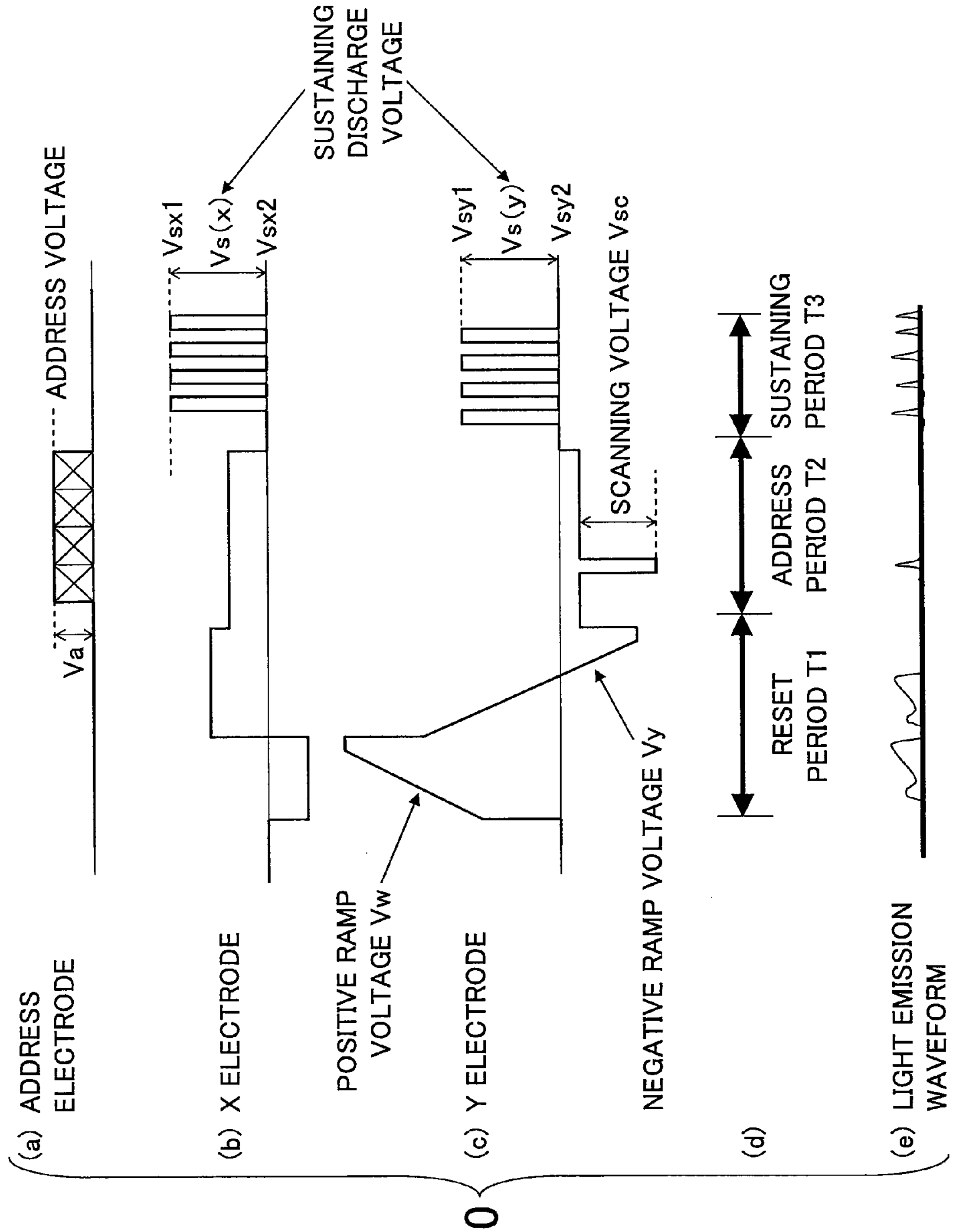
FIG. 10 is a drawing illustrating driving waveforms and a light emission waveform in a related-art plasma display.
Figure 11:
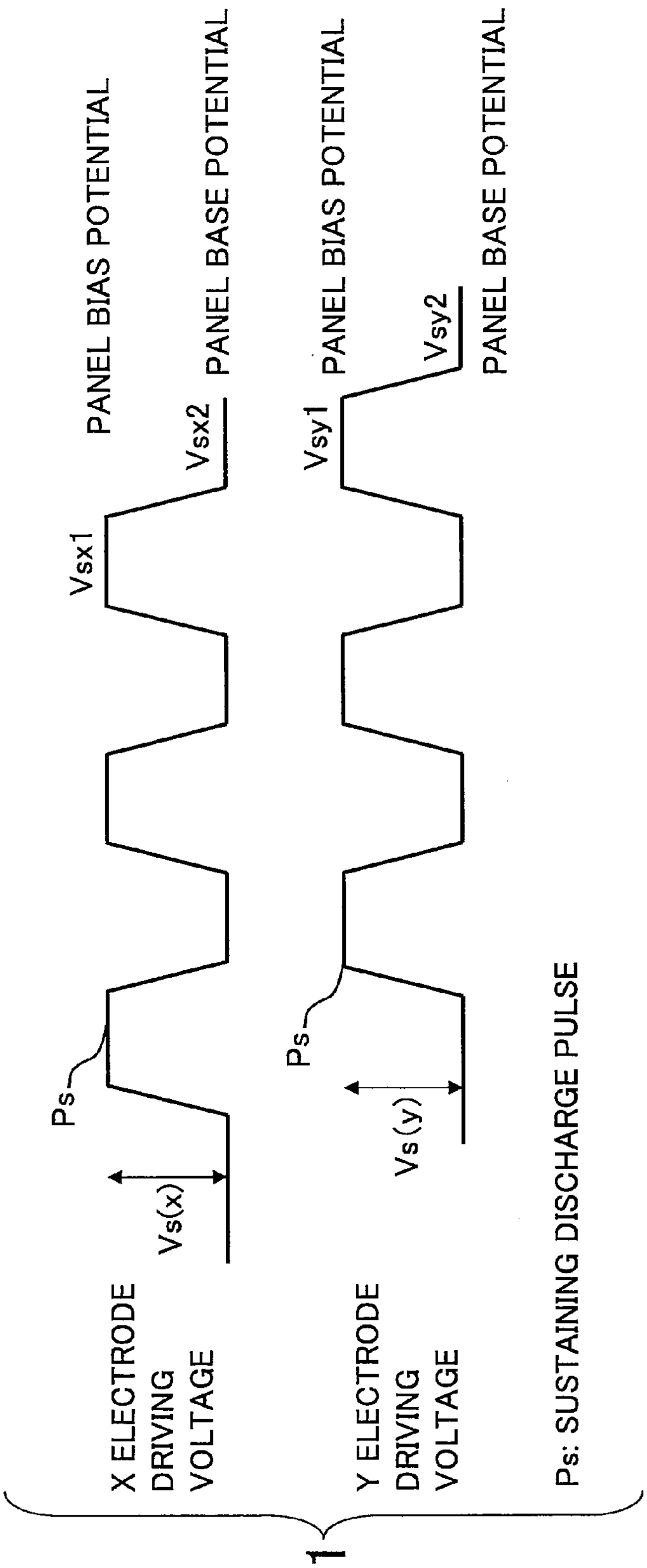
FIG. 11 is a drawing illustrating exemplary sustaining pulses in a related-art plasma display.

As shown by FIG. 1 (*d*) and as described above with reference to FIG. 10 (*d*), each subfield includes a reset period for initializing cells, an address period for selecting cells to be turned on, and a sustaining period for applying sustaining pulses for a number of times corresponding to the luminance of the cells. In a plasma display, one field of image is divided into multiple subfields, and address electrodes, X electrodes, and Y electrodes are driven to cause the cells to emit light for each subfield. This method is called a subfield method. In the subfield method, gradations of an image are expressed by combinations of the subfields and each subfield period includes the reset period, the address period, and the sustaining period as shown by FIG. 1(*d*).

As shown by FIGS. 1 (*a*) and (*d*), an address voltage Va for selecting cells is supplied to the address electrode during the address period. As shown by FIGS. 1 (*b*) and (*d*), a sustaining discharge voltage Vs(x) is supplied to the X electrode during the sustaining period. As shown by FIGS. 1 (*c*) and (*d*), reset pulses formed by a positive ramp voltage Vw and a negative ramp voltage Vy are supplied to the Y electrode during the reset period. Also, the Y electrode is supplied with a scanning voltage Vsc for scanning during the address period and a sustaining discharge voltage Vs(y) during the sustaining period.

As indicated by driving waveforms of the X and Y electrodes during the sustaining period in FIGS. 1 (*b*), (*c*), and (*d*), the sustaining discharge voltage Vs(x) of sustaining pulses applied to the X electrode is lower than the sustaining discharge voltage Vs(y) of sustaining pulses applied to the Y electrode. In this example, at the beginning of the sustaining period, a sustaining pulse is generated by the sustaining discharge voltage Vs(y) for the Y electrode and then a sustaining pulse for the X electrode is generated by the sustaining discharge voltage Vs(x) that is lower than the sustaining discharge voltage Vs (y). Compared with a case where the X and Y electrodes are driven by the same sustaining discharge voltage during the sustaining period, this configuration makes it possible to drive the X electrodes with a low sustaining discharge voltage without affecting the potential difference between panel electrodes and thereby makes it possible to simplify a circuit for the X electrodes.

First Embodiment

Figure 2:
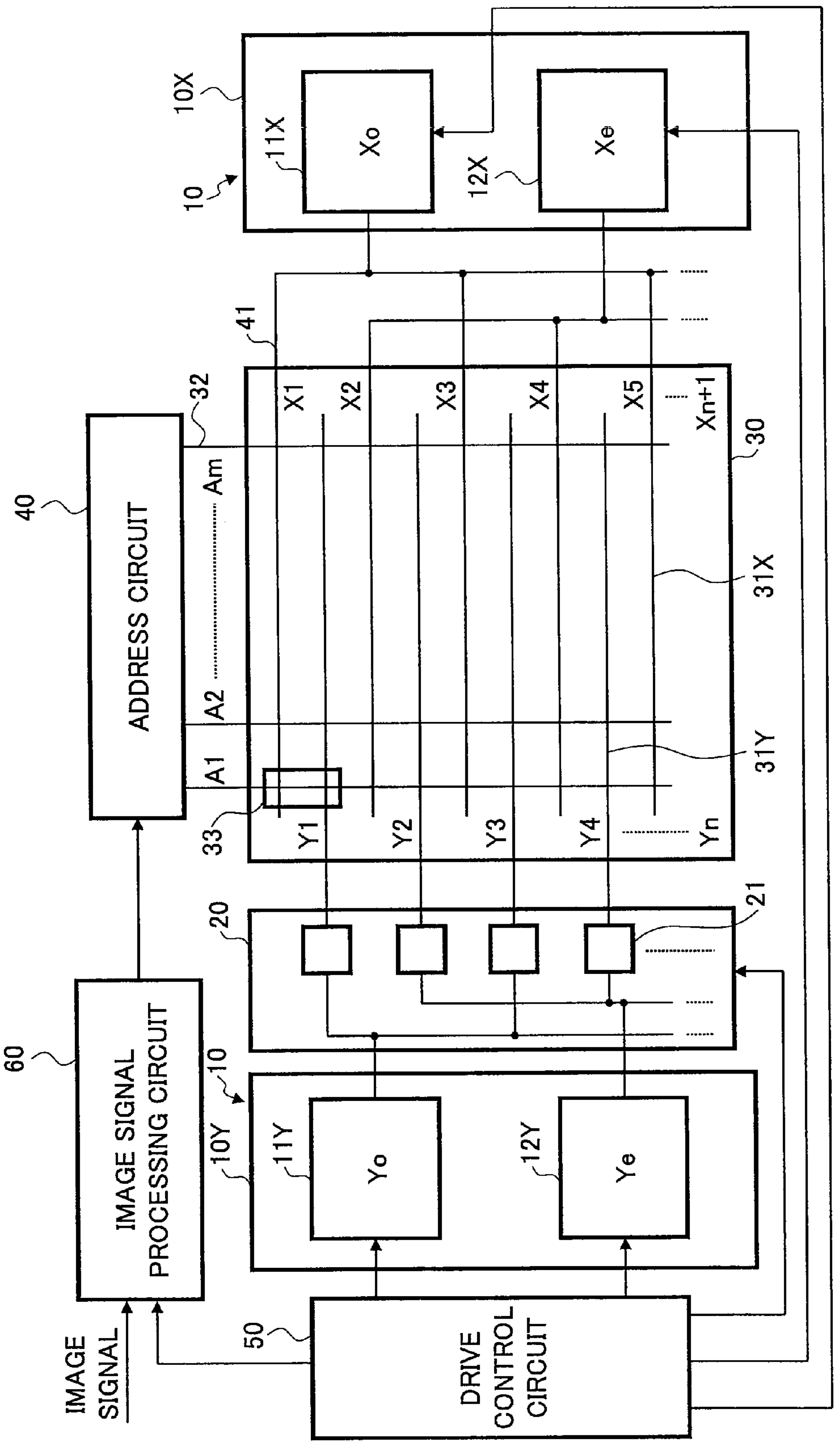
FIG. 2 is a schematic diagram illustrating a configuration of a plasma display according to a first embodiment of the present invention.

FIG. 2 is a schematic diagram illustrating a configuration of a plasma display according to a first embodiment of the present invention. A plasma display of this embodiment includes electrode driving circuits 10 including a Y-electrode driving circuit 10Y and an X-electrode driving circuit 10X, a scanning circuit 20, a plasma display panel (PDP) 30, an address circuit 40, a drive control circuit 50, and an image signal processing circuit 60.

The PDP 30 is a display panel for displaying an image and has a configuration based on the ALIS method described above. The PDP 30 includes "n" Y electrodes 31Y and "n+1" X electrodes 31X that are arranged parallel to each other in the horizontal direction and arranged alternately in the vertical direction. The PDP 30 also includes address electrodes 32 that are orthogonal to the Y electrodes 31Y and the X electrodes 31X. Thus, the electrodes are arranged to form a matrix. Display cells 33 are formed at intersections of the Y electrodes 31Y, the X electrodes 31X, and the address electrodes 32. The Y electrodes 31Y and the X electrodes 31X are used as display electrodes. During a sustaining period of a subfield, sustaining pulses are applied separately to the Y electrodes 31Y and the X electrodes 31X. As a result, sustaining discharge occurs between the Y electrodes 31Y and the X electrodes 31X. The Y electrodes 31Y may be called scanning electrodes and the X electrodes 31X may be called sustaining electrodes.

During the sustaining period, light is emitted at all gaps between electrodes (the Y electrodes 31Y and the X electrodes 31X). In other words, 2n display lines are formed by 2n+1 display electrodes (the Y electrodes 31Y and the X electrodes 31X).

With the ALIS method, however, it is not possible to cause sustaining discharge between all pairs of display electrodes at once. Therefore, in the ALIS method, interlaced scanning is employed. In the interlaced scanning, odd display lines are displayed for an odd field and even display lines are displayed for an even field. The odd field and the even field form one image.

The scanning circuit 20 is connected to the Y electrodes 31Y and includes switches 21. During the address period, the scanning circuit 20 is connected via the switches 21 to the Y electrodes 31Y and applies scanning pulses in sequence to the Y electrodes 31Y according to a control signal from the drive control circuit 50. Meanwhile, during the sustaining (sustaining discharge) period, the Y electrodes 31Y are connected via the switches 21 to the Y-electrode driving circuit 10Y. Also during the sustaining period, the X electrodes 31X are connected to the X-electrode driving circuit 10X.

The Y-electrode driving circuit 10Y includes a sustaining circuit 11Y and a sustaining circuit 12Y that drive the Y electrodes 31Y to cause sustaining discharge. The sustaining circuits 11Y and 12Y apply sustaining pulses to the Y electrodes 31Y. The sustaining circuit 11Y drives odd Y electrodes 31Y and may also be called an odd-Y-electrode driving circuit (Yo). The sustaining circuit 12Y drives even Y electrodes 31Y and may also be called an even-Y-electrode driving circuit (Ye). During the sustaining period, odd Y electrodes 31Y are connected to the odd-Y-electrode driving circuit 11Y and even Y electrodes 31Y are connected to the even-Y-electrode driving circuit 12Y.

Similarly, the X-electrode driving circuit 10X includes a sustaining circuit 11X and a sustaining circuit 12X that drive the X electrodes 31X to cause sustaining discharge. The sustaining circuit 11X drives odd X electrodes 31X and may also be called an odd-X-electrode driving circuit (Xo). The sustaining circuit 12X drives even X electrodes 31X and may also be called an even-X-electrode driving circuit (Xe). During the sustaining period, odd X electrodes 31Y are connected to the odd-X-electrode driving circuit 11X and even X electrodes 31X are connected to the even-X-electrode driving circuit 12X.

The image signal processing circuit 60 converts an input image signal into image data with a format suitable for processing in the plasma display and supplies the image data to the address circuit 40. The address circuit 40 is connected to the address electrodes 32 and during the address period, generates address pulses based on the image data from the image signal processing circuit 60 and according to the scanning pulses from the scanning circuit 20. The address pulses are supplied to the address electrodes 32 to cause address discharge.

Thus, the electrode driving circuit 10 including the Y-electrode driving circuit 10Y and the X-electrode driving circuit 10X causes the plasma display panel 30 to display an image by applying sustaining pulses having sustaining discharge voltages to the Y electrodes 31Y and X electrodes 31X during the sustaining period and thereby causing the X and Y electrodes to generate sustaining discharge for a number of times corresponding to the luminance of the respective display cells 33 selected by the address discharge.

The drive control circuit 50 generates and outputs control signals for controlling components of the plasma display including the address circuit 40, the scanning circuit 20, and the electrode driving circuits 10 (the Y-electrode driving circuit 10Y and the X-electrode driving circuit 10X).

In the plasma display of this embodiment configured as described above, the address circuit 40, during the address period, generates address pulses based on pixel data and according to scanning pulses from the scanning circuit 20 and supplies the address pulses to the address electrodes 32. As a result, address discharge occurs at selected display cells 33 of the PDP 30.

Also in the sustaining period, the odd-X-electrode driving circuit 11X, the even-X-electrode driving circuit 12X, the odd-Y-electrode driving circuit 11Y, and the even-Y-electrode driving circuit 12Y drive odd display lines and even display lines of the PDP 30 and thereby cause the Y electrodes 31Y and the X electrodes 31X to generate sustaining discharge at positions corresponding to the display cells 33 selected by the address discharge.

Figure 3:
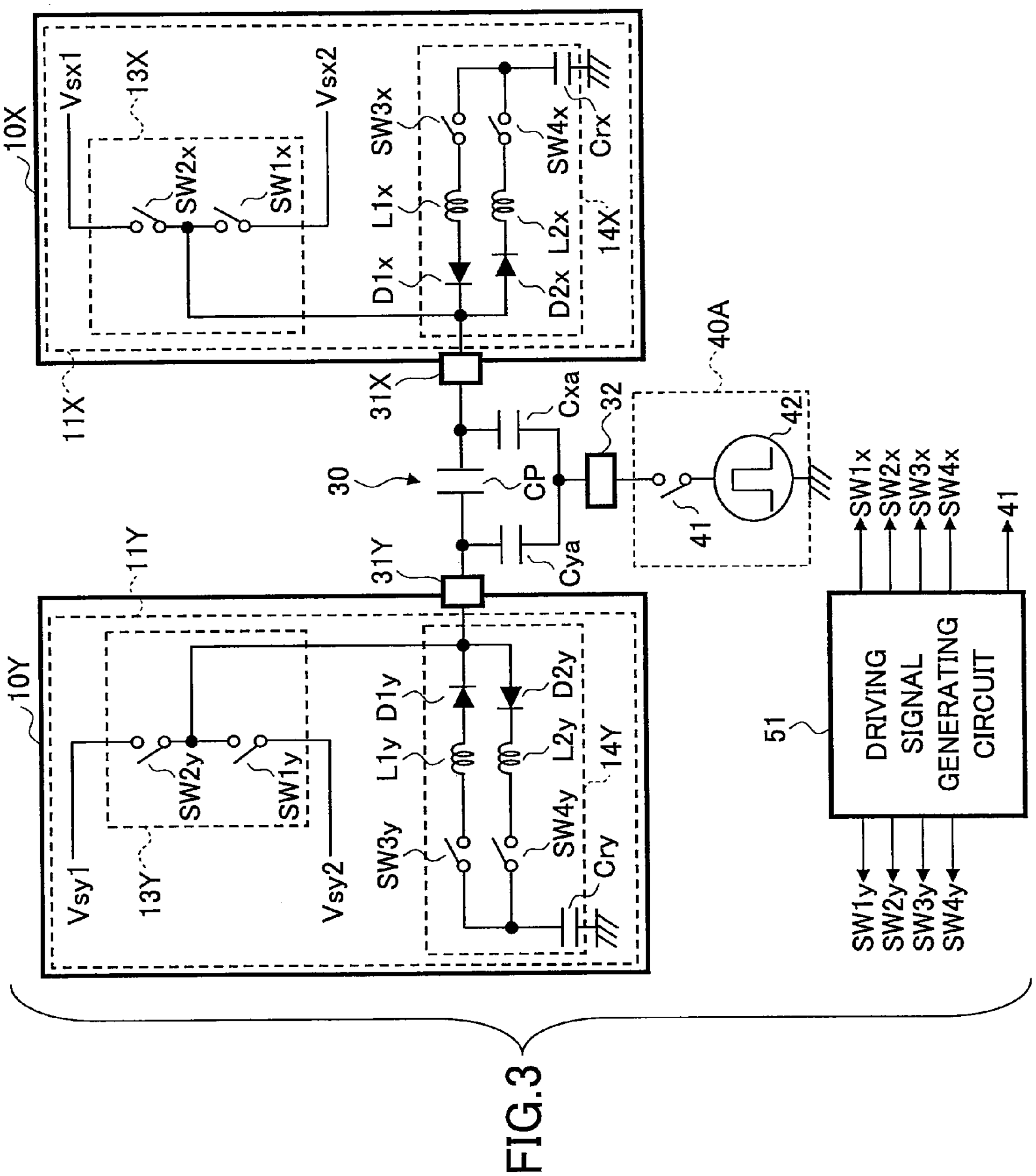
FIG. 3 is a drawing illustrating exemplary configurations of a Y-electrode driving circuit 10Y and an X-electrode driving circuit 10X.

FIG. 3 is a drawing illustrating exemplary configurations of the Y-electrode driving circuit 10Y and the X-electrode driving circuit 10X. In FIG. 3, the PDP 30 is connected to the Y-electrode driving circuit 10Y and the X-electrode driving circuit 10X. The Y-electrode driving circuit 10Y drives the PDP 30 via the Y electrodes 31Y and the X-electrode driving circuit 10X drives the PDP 30 via the X electrodes 31X.

The X-electrode driving circuit 10X includes the odd-X-electrode driving circuit 11X for driving the odd X electrodes 31X and the even-X-electrode driving circuit 12X for driving the even X electrodes 31X. The odd-X-electrode driving circuit 11X includes a clamping circuit 13X and a power recovery circuit 14X. The even-X-electrode driving circuit 12X has a configuration and a function similar to those of the odd-X-electrode driving circuit 11X. Therefore, the even-X-electrode driving circuit 12X is omitted in FIG. 3 and only an exemplary configuration of the odd-X-electrode driving circuit 11X for driving the odd X electrodes 31X is described below.

The Y-electrode driving circuit 10Y includes the odd-Y-electrode driving circuit 11Y for driving the odd Y electrodes 31Y and the even-Y-electrode driving circuit 11Y for driving the even Y electrodes 31Y. The odd-Y-electrode driving circuit 11Y includes a clamping circuit 13Y and a power recovery circuit 14Y. The even-Y-electrode driving circuit 12Y has a configuration and a function similar to those of the odd-Y-electrode driving circuit 11Y. Therefore, the even-Y-electrode driving circuit 12Y is omitted in FIG. 3 and only an exemplary configuration of the odd-Y-electrode driving circuit 11Y for driving the odd Y electrodes 31Y is described below. In the X-electrode driving circuit 10X and the Y-electrode driving circuit 10Y, the same reference numbers are used for components having the same functions and suffixes x and y are attached to the reference numbers to distinguish the components for the electrode driving circuits 10X and 10Y. For brevity and descriptive purposes, the PDP 30 in FIG. 3 is represented by one set of a Y electrode 31Y, an X electrode 31X, and an address electrode 32 which form a display cell 33.

The clamping circuit 13X of the odd-X-electrode driving circuit 11X includes switches SW1*x* and SW2*x* made of, for example, MOSFETs or IGBTs. Similarly, the clamping circuit 13Y of the odd-Y-electrode driving circuit 11Y includes switches SW1*y* and SW2*y* made of, for example, MOSFETs or IGBTs.

The power recovery circuit 14Y includes a module including a unidirectional diode D1*y*, a switch SW3*y* for turning on and off an electric path, and a coil L1*y* forming an inductor that are connected in series. The power recovery circuit 14Y also includes a module including a unidirectional diode D2*y*, a switch SW4*y* for turning on and off an electric path, and a coil L2*y* forming an inductor that are connected in series. The switches SW3*y* and SW4*y* turn on and off the charge and discharge paths of the corresponding coils L1*y* and L2*y*. The diodes D1*y* and D2*y* prevent reverse currents from flowing.

In the power recovery circuit 14Y, the switches SW3*y* and SW4*y* connected to the coils L1*y* and L2*y* are turned on and off alternately during periods before and after clamping operations to switch the charge and discharge paths for a display panel capacitor CP. As a result, the display panel capacitor CP is charged and discharged. Exemplary processes in the power recovery circuit 14Y are described below. When electric charge is stored in a power recovery capacitor Cry and all switches SW1*y*, SW2*y*, SW3*y*, and SW4*y* are turned off, the switch SW3*y* is turned on. As a result, LC resonance occurs between the panel capacitor CP and the coil L1*y* and a voltage is applied from the power recovery capacitor Cry to the panel capacitor CP. When the switch SW3*y* is turned off, the switch SW2*y* is turned on to clamp the voltage at a high voltage Vsy1. Meanwhile, in a discharge process, the switch SW2*y* is turned off and after a while, the switch SW4*y* is turned on. As a result, LC resonance occurs between the panel capacitor CP and the coil L2*y*, the voltage of the panel capacitor CP decreases, and electric charge is stored in the power recovery capacitor Cry, i.e., power is recovered. Then, the switch SW4*y* is turned off and the switch SW1*y* is turned on to clamp the voltage at a low voltage Vsy2. Thus, the odd-Y-electrode driving circuit 11Y can apply a sustaining pulse to the Y-electrode 31Y and also recover power using the power recovery capacitor Cry. In a similar manner, the odd-X-electrode driving circuit 11X of the X-electrode driving circuit 10X can apply a sustaining pulse to the X-electrode 31X and also recover power using the power recovery capacitor Crx.

The address circuit 40 includes an address electrode driving circuit 40A including a switch 41 and an address pulse generating circuit 42. During the address period shown in FIG. 2, the switch 41 is turned on and the address pulse generating circuit 42 supplies an address pulse to the address electrode 32 to select an address (the display cell 33). Each time the address pulse is supplied, address discharge occurs at a capacitor Cya between the address electrode 32 and the Y electrode 31Y and the address discharge triggers sustaining discharge between the Y electrode 31Y and the X electrode 31X during the sustaining period. The switch 41 is turned off during periods (the reset period and the sustaining period) other than the address period.

The switches SW1*y* through SW4*y*, SW1*x* through SW4*x*, and 41 are controlled by the drive control circuit 50. Control signals for controlling the switches SW1*y* through SW4*y*, SW1*x* through SW4*x*, and 41 are generated, for example, by a driving signal generating circuit 51.

Figure 4:
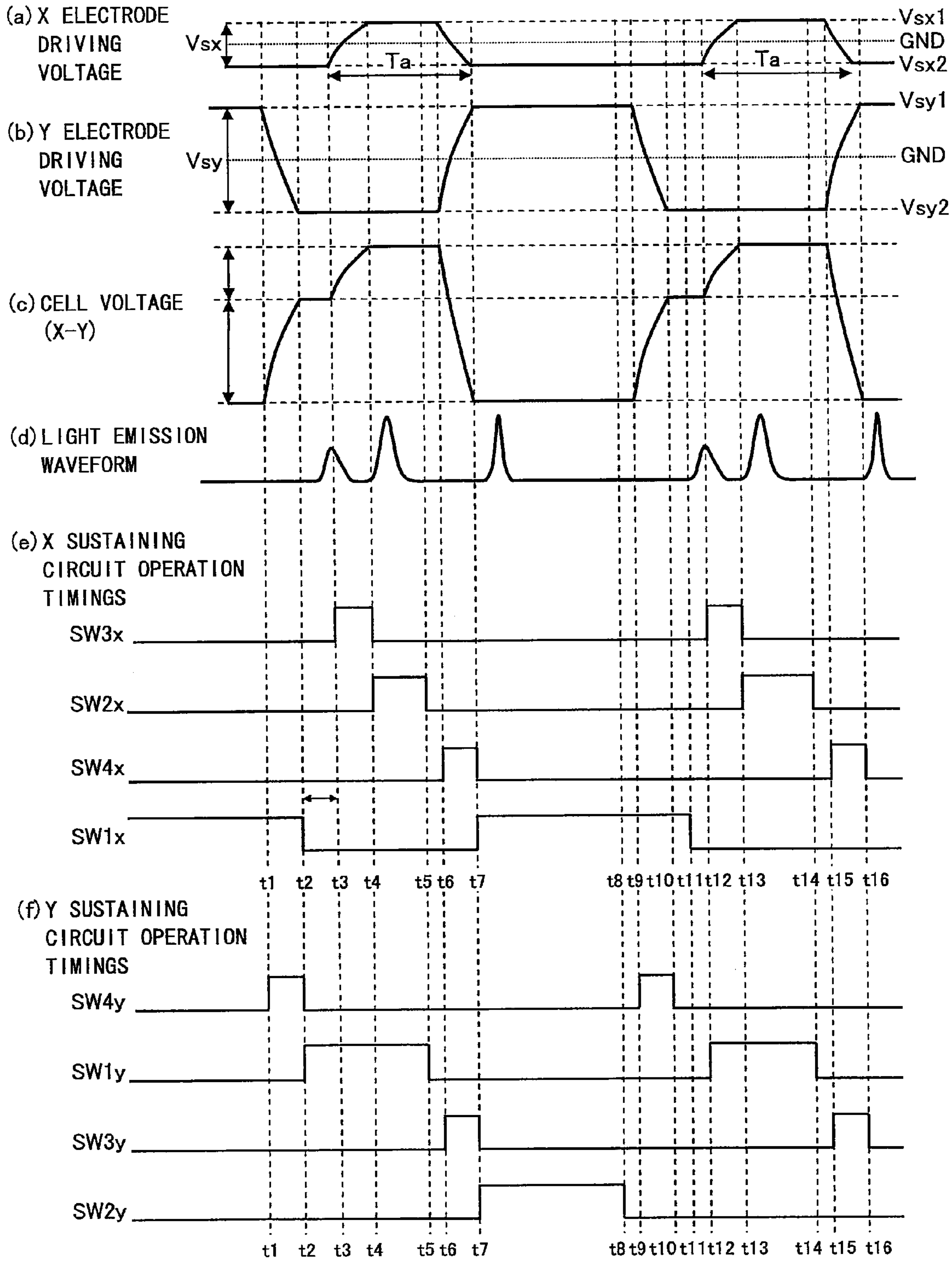
FIG. 4 is a drawing illustrating examples of display electrode driving waveforms and switch operation timings in a plasma display and a plasma display panel driving method according to the first embodiment.

FIG. 4 is a drawing illustrating examples of driving waveforms applied to the display electrodes (the Y electrodes 31Y and the X electrodes 31X) from the sustaining circuits 11X, 12X, 11Y, and 12Y and operation timings of the switches SW1*x* through SW4*x* and SW1*y* through SW4*y* shown in FIG. 3 in a plasma display and a plasma display panel driving method according to the first embodiment. Hereafter, the odd-X-electrode driving circuit 11X and the even-X-electrode driving circuit 12X are collectively called an X sustaining circuit 11X, 12X and the odd-Y-electrode driving circuit 11Y and the even-Y-electrode driving circuit 12Y are collectively called a Y sustaining circuit 11Y, 12Y. Also, the X electrodes 31X, the Y electrodes 31Y, and the display cells 33 are expressed in singular forms for descriptive purposes.

FIG. 4 (*a*) shows a driving voltage waveform of the X electrode 31X. FIG. 4 (*b*) shows a driving voltage waveform of the Y electrode 31Y. FIG. 4 (*c*) shows a potential difference waveform applied to the display cell 33. The potential difference is obtained by subtracting the driving voltage applied to the Y electrode 31Y from the driving voltage applied to the X electrode 31X. FIG. 4 (*d*) shows a light emission waveform of the display cell 33. FIG. 4 (*e*) shows operation timings of the switches SW1*x* through SW4*x* of the X sustaining circuit 11X, 12X of the X-electrode driving circuit 10X. FIG. 4 (*f*) shows operation timings of the switches SW1*y* through SW4*y* of the Y sustaining circuit 11Y, 12Y of the Y-electrode driving circuit 10Y.

Below, exemplary operations in respective time periods of the plasma display of this embodiment are described with reference to FIG. 4. Here, it is assumed that the X electrode 31X and the Y electrode 31Y are driven by driving voltages shown by FIGS. 4 (*a*) and (*b*), the switches SW1*x* through SW4*x* are operated at the operation timings shown by FIG. 4 (*e*), and the switches SW1*y* through SW4*y* are operated at the operation timings shown by FIG. 4 (*f*).

Period t1-t2:

The period t1-t2 corresponds to the first pulse in the sustaining period. For the X-electrode side, the period t1-t2 is a part of the sustaining period during which the switch SW1*x* of the X sustaining circuit 11X, 12X is turned on. Meanwhile, for the Y-electrode side, the period t1-t2 corresponds to a fall time in the sustaining period. During this period, the switch SW4*y* of the power recovery circuit 14Y is turned on to recover or charge power (electric charge) via the diode D2*y* and the coil L2*y* from the PDP 30. Switches other than the switch SW4*y* of the Y sustaining circuit 11Y, 12Y are turned off during this period.

Period t2-t3:

For the X electrode side, the period t2-t3 corresponds to turn-off time in the sustaining period during which the switches SW1*x* through SW4*x* of the X sustaining circuit 11*x*, 12X are all turned off. Meanwhile, the switch SW1*y* of the Y sustaining circuit 11Y, 12Y is turned on during the period t2-t3 to supply the voltage Vsy2 to the Y electrode 31Y.

Period t3-t4:

For the X-electrode side, the period t3-t4 corresponds to a rise time in the sustaining period during which power is supplied to the X electrode 31X of the PDP 30 via the switch SW3*x* and the coil L1*x* of the power recovery circuit 14X. Meanwhile, in the Y sustaining circuit 11Y, 12Y, only the switch SW1*y* is turned on.

Period t4-t5:

For the X-electrode side, the period t4-t5 also corresponds to a part of the sustaining period during which the switch SW2*x* of the clamping circuit 13X of the X sustaining circuit 11X, 12X is turned on to supply the voltage Vsx1 to the X electrode 31X. Meanwhile, in the Y sustaining circuit 11Y, 12Y, only the switch SW1*y* is turned on.

Period t5-t6:

During the period t5-t6, the switch SW2*x* of the X sustaining circuit 11X, 12X is turned off to achieve high output impedance. Also, the switch SW1*y* of the Y sustaining circuit 11Y, 12Y is turned off to achieve high output impedance.

Period t6-t7:

For the X electrode side, the period t6-t7 corresponds to a fall time during which the switch SW4*x* of the power recovery circuit 14X is turned on to recover or charge power (electric charge) via the diode D2*x* and the coil L2*x* from the PDP 30. For the Y electrode side, the period t6-t7 corresponds to a rise time during which the switch SW1*y* of the clamping circuit 13Y is turned off and the switch SW3*y* of the power recovery circuit 14Y is turned on to connect the power recovery circuit 14Y to the Y electrode 31Y. Accordingly, power is supplied from the power recovery circuit 14Y to the Y electrode 31Y.

Thus, in the plasma display of this embodiment, as shown by FIGS. 4 (*a*) and (*b*), a sustaining pulse with a sustaining discharge voltage Vsx is applied to the X electrode 31X and a sustaining pulse with a sustaining discharge voltage Vsy is applied to the Y electrode 31Y during a time period Ta. As a result, as shown in FIG. 4 (*c*), the potential difference between the X electrode 31X and the Y electrode 31Y shows a voltage waveform obtained by adding a voltage waveform with a peak value Vsx to a voltage waveform with a peak value Vsy. In other words, the potential difference waveform shows a step corresponding to the amount of voltage applied to the X electrode 31X.

Here, it is assumed that a pulse applied to the X electrode 31X is a low-voltage sustaining pulse with a peak value Vsx that is not large enough to cause sustaining discharge in the display cell 33 by itself. For example, if a low-voltage sustaining pulse with a peak value Vsx of about 100 V is applied to the X electrode 31X when the Y electrode 31Y is at the ground potential, sustaining discharge does not normally occur. Meanwhile, a pulse applied to the Y electrode 31Y is a high-voltage sustaining pulse with a peak value Vsy that is large enough to cause sustaining discharge by itself. For example, if a high-voltage sustaining pulse with a peak value Vsy of about 200 to 300 V is applied to the Y electrode 31Y when the X electrode 31X is at the ground potential, the display cell 33 normally emits light. The above values are provided just as examples. In the first embodiment, a low-voltage sustaining pulse with a peak value not large enough to cause sustaining discharge by itself is applied to the X electrode 31X and a high-voltage sustaining pulse with a peak value large enough to cause sustaining discharge by itself is applied to the Y electrode 31Y such that the sustaining pulses have opposite phases. The high-voltage sustaining pulse applied to the Y electrode 31Y starts to fall at time t1 and reaches the lowest level at time t2. Meanwhile, the low-voltage sustaining pulse applied to the X electrode 31X starts to rise at time t3, i.e., after a period t1-t3 from the time when the high-voltage sustaining pulse starts to fall, and reaches the highest level at time t4. As a result, the potential difference between the X and Y electrode shows a waveform as shown by FIG. 4 (*c*) that includes a part (period t2-t3) where the potential difference equals the peak value Vsy and a part (period t4-t6) where the potential difference equals the sum of the peak values Vsx and Vsy.

With the potential difference waveform as shown by FIG. 4 (*c*), the display cell 33 shows a light emission waveform as shown by FIG. 4 (*d*). In FIG. 4 (*d*), the display cell 33 first emits light at a time after a predetermined period from the time when the potential difference waveform reaches the peak value Vsy at time t3 and emits light for a second time after the potential difference waveform reaches the peak value Vsy+Vsx at time t4. Thus, discharge occurs two times (first sustaining discharge and second sustaining discharge) consecutively within a half cycle of the sustaining pulses. This is called two-step discharge or two-peak discharge. In the two-peak discharge, unlike normal sustaining discharge where large discharge occurs only once, comparatively small discharge is caused to occur two times consecutively. The two-peak discharge can cause the display cell 33 to emit light with high efficiency. During the period t6-t7, the polarity of the low-voltage sustaining pulse applied to the X electrode 31X and the polarity of the high-voltage sustaining pulse applied to the Y electrode 31Y are reversed at the same time, and therefore large sustaining discharge occurs after a certain period of time. Because the wall charge in the display cell 33 tends to be disturbed after the two-peak discharge, it is preferable to adjust the wall charge by the large sustaining discharge to smoothly or correctly cause sustaining discharge thereafter. The plasma display and the plasma display panel driving method of the first embodiment make it possible to easily generate sustaining pulses that can efficiently and continuously generate proper sustaining discharge.

Also, with the above configuration, a low-voltage sustaining pulse with a peak value Vsx not large enough to cause sustaining discharge by itself is applied to the X electrode 31X. This makes it possible to use a low voltage-resistance circuit for the X sustaining circuit 11X, 12X of the X-electrode driving circuit 10X. This in turn makes it possible to use low voltage-resistance parts for the X sustaining circuit 11X, 12X and thereby makes it possible to reduce the costs. Further, applying a low-voltage sustaining pulse to the X electrode 31X makes it possible to reduce the power consumption of the X sustaining circuit 11X, 12X.

Thus, in the plasma display and the plasma display panel driving method according to the first embodiment, sustaining pulses are applied to the X and Y electrodes such that the potential difference between the X and Y electrodes at a given point(s) during the sustaining period becomes large enough to stably cause sustaining discharge. Also, the above configuration makes it possible to reduce the power loss of a power supply circuit provided for electrodes to which a low sustaining discharge voltage is applied and thereby makes it possible to reduce the size of a driving circuit board. This in turn makes it possible to reduce the costs of even a large plasma display panel with a high Xe content. In other words, the plasma display and the plasma display panel driving method of the first embodiment make it possible to cause sustaining discharge with high luminous efficacy while reducing the costs and power consumption of the X sustaining circuit 11X, 12X.

The peak value Vsy of the high-voltage sustaining pulse is preferably greater than or equal to two times and less than or equal to four times, more preferably greater than or equal to two and a half times and less than or equal to three and a half times, and still more preferably about three times greater than the peak value Vsx of the low-voltage sustaining pulse. For example, assuming that the peak value Vsx of the low-voltage sustaining pulse is 100 V, the peak value Vsy of the high-voltage sustaining pulse is preferably set between 200 and 400 V, and more preferably set at about 300 V. The relationships between the peak values of sustaining pulses described above may also apply to other embodiments described below. The peak values or voltages of the low-voltage sustaining pulse and the high-voltage sustaining pulse may be set, for example, by the sustaining circuits 11X, 12X, 11Y, and 12Y.

Second Embodiment

Figure 5:
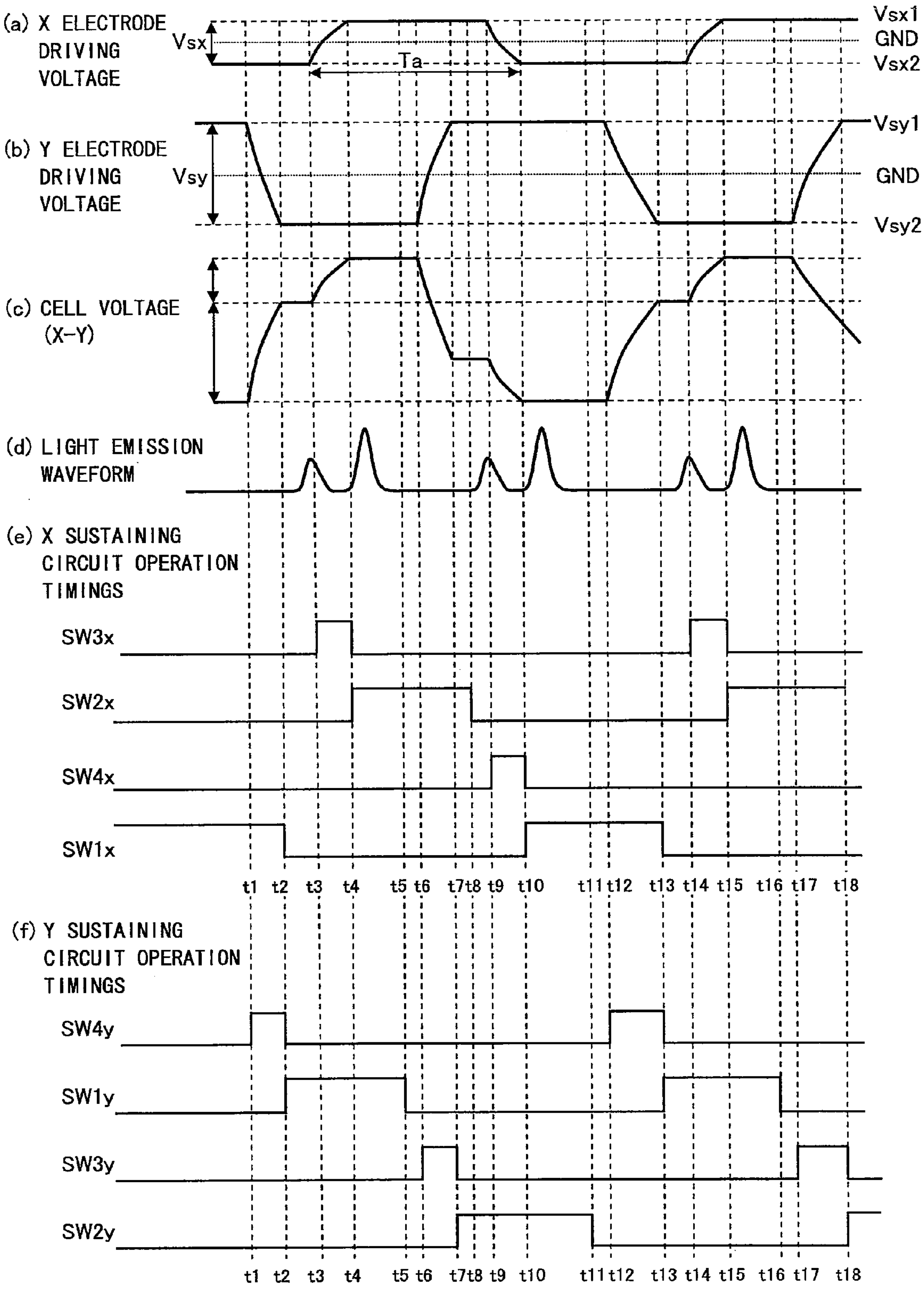
FIG. 5 is a drawing illustrating examples of display electrode driving waveforms and switch operation timings in a plasma display and a plasma display panel driving method according to a second embodiment of the present invention.

FIG. 5 is a drawing illustrating examples of driving waveforms applied to the display electrodes (the X electrode 31X and the Y electrode 31Y) and operation timings of switches in a plasma display and a plasma display panel driving method according to a second embodiment of the present invention. In the plasma display and the plasma display panel driving method of the second embodiment, a low-voltage sustaining pulse is applied to the X electrode 31X as in the first embodiment. In the second embodiment, however, the width of the low-voltage sustaining pulse is changed such that the low-voltage sustaining pulse starts to fall at a timing that is different from the first embodiment with respect to the high-voltage sustaining pulse output from the Y sustaining circuit 11Y, 12Y and sustaining discharge occurs at different timings. The general configuration of the plasma display of this embodiment is substantially the same as that of the first embodiment shown in FIG. 3 and therefore its description is omitted here.

Similar to FIG. 4 of the first embodiment, FIG. 5 (*a*) shows a driving voltage waveform of the X electrode 31X and FIG. 5 (*b*) shows a driving voltage waveform of the Y electrode 31Y. FIG. 5 (*c*) shows a potential difference obtained by subtracting an electric potential of the Y electrode 31Y from an electric potential of the X electrode 31X. FIG. 5 (*d*) shows a light emission waveform of the display cell 33. FIG. 5 (*e*) shows operation timings of the switches SW1*x* through SW4*x* of the X sustaining circuit 11X, 12X. FIG. 5 (*f*) shows operation timings of the switches SW1*y* through SW4*y* of the Y sustaining circuit 11Y, 12Y.

The relationships between the driving voltage waveforms for the X electrode 31X and the Y electrode 31Y shown by FIGS. 5 (*a*) and (*b*) and the operation timings of the switches SW1*x* through SW4*x* and SW1*y* through SW4*y* shown by FIGS. 5 (*e*) and (*f*) are substantially the same as those shown by FIGS. 4 (*a*), (*b*), (*e*), and (*f*) of the first embodiment, and therefore their descriptions are omitted here.

The voltage waveforms of the low-voltage sustaining pulse applied to the X electrode 31X and the high-voltage sustaining pulse applied to the Y electrode 31Y during the period t1-t6 in FIGS. 5 (*a*) and (*b*) are substantially the same as those of the first embodiment. Also, the potential difference waveform and the light emission waveform during the period t1-t6 in FIGS. 5 (*c*) and (*d*) are substantially the same as those of the first embodiment.

During the period t6-t7 in FIG. 4 (*a*) of the first embodiment, the polarity of the low-voltage sustaining pulse applied to the X electrode 31X and the polarity of the high-voltage sustaining pulse applied to the Y electrode 31Y are reversed at the same time. Meanwhile, during the period t6-t7 in FIG. 5 (*a*) of the second embodiment, the low-voltage sustaining pulse is maintained at the positive voltage Vsx1. In the second embodiment, the polarity of the low-voltage sustaining pulse is reversed from Vsx1 to Vsx2 during the period t9-t10. In other words, the low-voltage sustaining pulse falls after a time period from the time when the high-voltage sustaining pulse in the next half cycle rises in the period t6-t7.

As a result, as shown in FIG. 5 (*c*), the potential difference between the display electrodes shows a waveform having two steps during the fall time between t6 and t10. With this configuration, as shown in FIG. 5 (*d*), two-peak discharge also occurs when the potential difference waveform of the display electrodes falls. This configuration makes it possible to more efficiently cause sustaining discharge.

Thus, in the plasma display and the plasma display panel driving method of the second embodiment, a driving voltage is applied to the X electrode 31X at timings different from the first embodiment. This configuration makes it possible to more stably and efficiently cause sustaining discharge.

Third Embodiment

Figure 6:
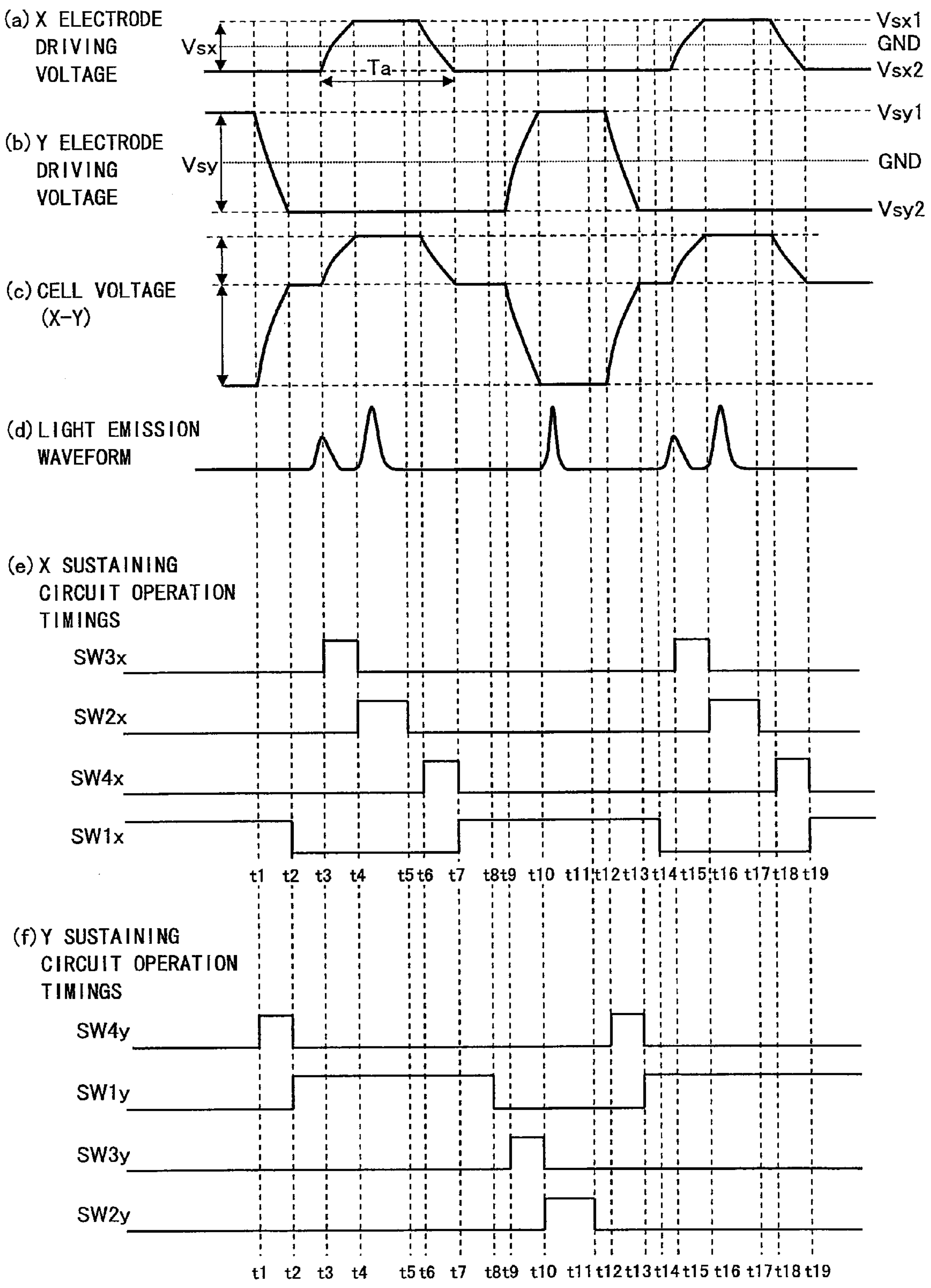
FIG. 6 is a drawing illustrating examples of display electrode driving waveforms and switch operation timings in a plasma display and a plasma display panel driving method according to a third embodiment of the present invention.

FIG. 6 is a drawing illustrating examples of driving waveforms applied to the display electrodes (the X electrode 31X and the Y electrode 31Y) and operation timings of the switches SW1*x* through SW4*x* and SW1*y* through SW4*y* in a plasma display and a plasma display panel driving method according to a third embodiment of the present invention. Similar to FIG. 4 of the first embodiment, FIG. 6 (*a*) shows a driving voltage waveform of the X electrode 31X and FIG. 6 (*b*) shows a driving voltage waveform of the Y electrode 31Y. FIG. 6 (*c*) shows a potential difference obtained by subtracting an electric potential of the Y electrode 31Y from an electric potential of the X electrode 31X. FIG. 6 (*d*) shows a light emission waveform of the display cell 33. FIG. 6 (*e*) shows operation timings of the switches SW1*x* through SW4*x* of the X sustaining circuit 11X, 12X. FIG. 6 (*f*) shows operation timings of the switches SW1*y* through SW4*y* of the Y sustaining circuit 11Y, 12Y.

In the second embodiment, the width of the low-voltage sustaining pulse applied to the X electrode 31X is changed from that of the first embodiment. In the plasma display and the plasma display panel driving method of the third embodiment, the width and timing of the high-voltage sustaining pulse applied to the Y electrode 31Y are changed. The general configuration of the plasma display of this embodiment is substantially the same as that of the first embodiment shown in FIG. 3 and therefore its description is omitted here.

The relationships between the driving voltage waveforms of the X electrode 31X and the Y electrode 31Y shown by FIGS. 6 (*a*) and (*b*) and the operation timings of the switches SW1*x* through SW4*x* and SW1*y* through SW4*y* shown by FIGS. 6 (*e*) and (*f*) are substantially the same as those shown by FIGS. 4 (*a*), (*b*), (*e*), and (*f*) of the first embodiment, and therefore their descriptions are omitted here.

In FIG. 6, the driving voltage Vsy1 output from the Y sustaining circuit 11Y, 12Y is applied to the Y electrode 31Y for a shorter period of time. As a result, the high-voltage sustaining pulse applied to the Y electrode 31Y is maintained at the lowest level Vsy2 for a longer period of time as shown in FIG. 6 (*b*), and the potential difference between the display electrodes shows a waveform as shown by FIG. 6 (*c*) where a pulse with the peak value Vsx is put on the top center of a pulse with the peak value Vsy. The potential difference waveform of the display electrodes shown by FIG. 6 (*c*) rises in two steps during the periods t1-t3 and t3-t4. Therefore, as shown in FIG. 6 (*d*), the light emission waveform of the display cell 33 shows two-peak discharge. The potential difference waveform of the display electrodes shown by FIG. 6 (*c*) falls also in two steps during the periods t6-t9 and t9-t10. The display cell 33 emits light only once after a predetermined time period from time t10 when the potential difference becomes large.

Thus, in the plasma display and the plasma display panel driving method of the third embodiment, the low-voltage sustaining pulse output from the X sustaining circuit 11X, 12X rises after a certain period of time from the fall of the high-voltage sustaining pulse output from the Y sustaining circuit 11Y, 12Y and the high-voltage sustaining pulse is applied for a shorter period of time. This configuration makes it possible to cause two-peak discharge first and then cause large one-peak discharge. This in turn makes it possible to reduce the power consumption of the Y sustaining circuit 11Y, 12Y and to achieve high luminous efficacy.

Fourth Embodiment

Figure 7:
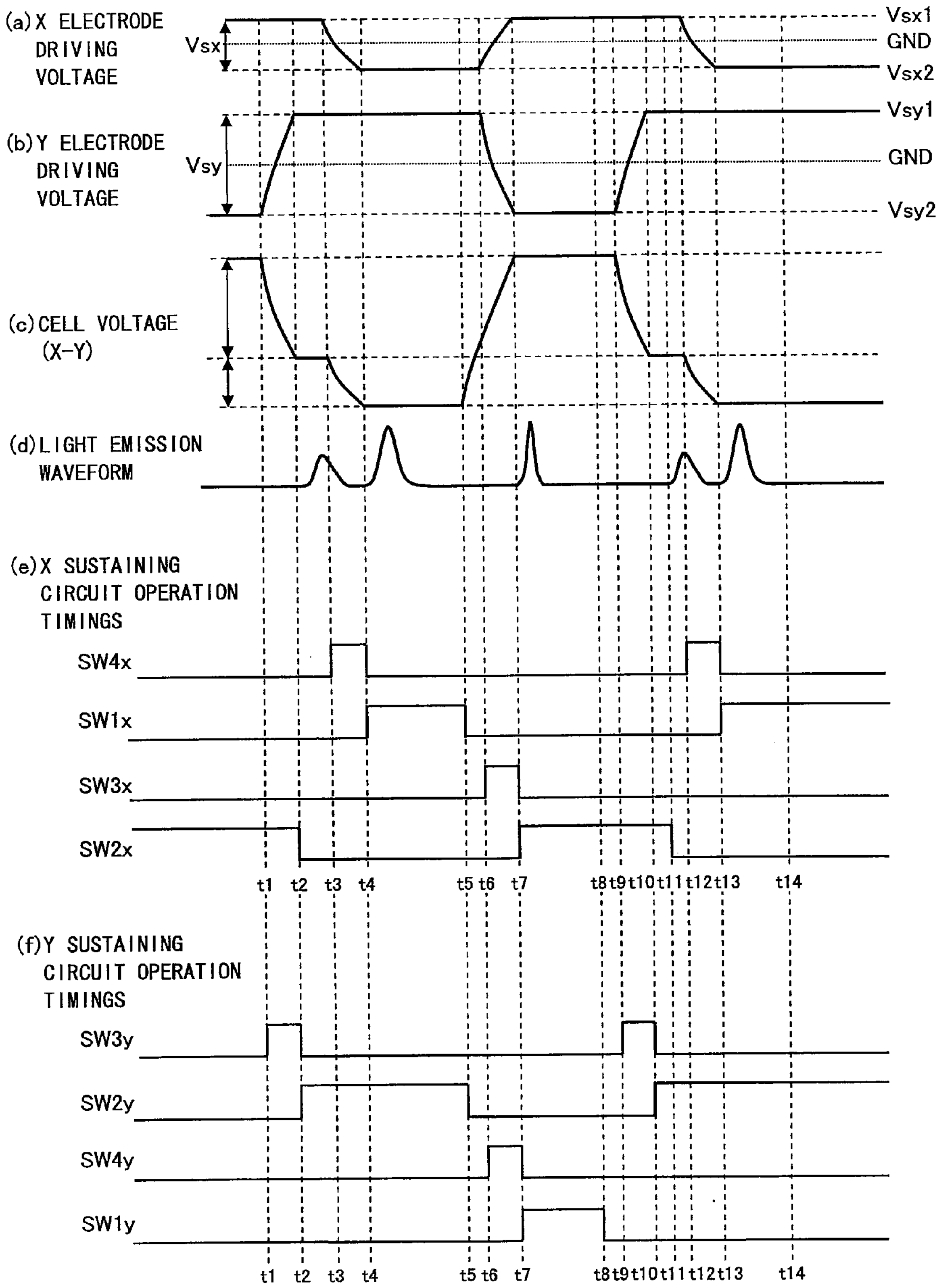
FIG. 7 is a drawing illustrating examples of display electrode driving waveforms and switch operation timings in a plasma display and a plasma display panel driving method according to a fourth embodiment of the present invention.

FIG. 7 is a drawing illustrating examples of driving waveforms applied to the display electrodes (the X electrode 31X and the Y electrode 31Y) and operation timings of the switches SW1*x* through SW4*x* and SW1*y* through SW4*y* in a plasma display and a plasma display panel driving method according to a fourth embodiment of the present invention. Similar to FIG. 4 of the first embodiment, FIG. 7 (*a*) shows a driving voltage waveform of the X electrode 31X and FIG. 7 (*b*) shows a driving voltage waveform of the Y electrode 31Y. FIG. 7 (*c*) shows a potential difference obtained by subtracting an electric potential of the Y electrode 31Y from an electric potential of the X electrode 31X. FIG. 7 (*d*) shows a light emission waveform of the display cell 33. FIG. 7 (*e*) shows operation timings of the switches SW1*x* through SW4*x* of the X sustaining circuit 11X, 12X. FIG. 7 (*f*) shows operation timings of the switches SW1*y* through SW4*y* of the Y sustaining circuit 11Y, 12Y.

In the first through third embodiments described above, the high-voltage sustaining pulse applied to the Y electrode 31Y falls from the positive polarity to the negative polarity, and after a delay, the low-voltage sustaining pulse applied to the X electrode 31X rises from the negative polarity to the positive polarity. In the fourth embodiment, the phases of the high and low voltage sustaining pulses are opposite to those in the first through third embodiments. The general configuration of the plasma display of this embodiment is substantially the same as that of the first embodiment shown in FIG. 3 and therefore its description is omitted here.

In FIG. 7 (*b*), the high-voltage sustaining pulse applied to the Y electrode 31Y starts to rise at time t1 from the negative voltage Vsy2 and reaches the positive highest level Vsy1 at time t2, and is maintained at the highest level Vsy1 until time t6. Then, during the period t6-t7, the high-voltage sustaining pulse falls from the highest level Vsy1 to the lowest level Vsy2. Meanwhile, in FIG. 7 (*a*), the low-voltage sustaining pulse applied to the X electrode 31X starts to fall at time t3 from the positive potential Vsx1 and reaches the negative lowest level Vsx2 at time t4, and is maintained at the lowest level Vsx2 until time t6. Then, during the period t6-t7, the low-voltage sustaining pulse rises from the lowest level Vsx2 to the highest level Vsx1.

Thus, the low-voltage sustaining pulse of FIG. 7 (*a*) starts to fall at time t3 after the high-voltage sustaining pulse of FIG. 7 (*b*) starts to rise at time t1; and the low-voltage sustaining pulse starts to rise and the high-voltage sustaining pulse starts to fall at the same time t6. Therefore, as shown in FIG. 7 (*c*), the potential difference between the display electrodes becomes a value obtained by subtracting the peak value Vsy of the high-voltage sustaining pulse from the highest voltage (Vsx1+Vsy1) during the period t2-t3 and becomes a value obtained by subtracting the sum of the peak values Vsx and Vsy from the highest voltage during the period t4-t5. In other words, the potential difference forms a two-step waveform. As a result, as shown by the light emission waveform of FIG. 7 (*d*), first sustaining discharge occurs after the potential difference waveform of the display electrodes changes—Vsy and second sustaining discharge occurs after the potential difference waveform changes—(Vsx+Vsy). In other words, two-peak discharge occurs. Then, after the potential difference waveform increases by the sum of Vsx and Vsy during the period t5-t7, a large third sustaining discharge occurs.

The driving waveforms of the fourth embodiment shown in FIG. 7 are obtained by reversing the polarity of the driving waveforms of the first embodiment shown in FIG. 4. Therefore, although the polarity of the X electrode 31X and polarity of the Y electrode 31Y are opposite to those in the first embodiment, the light emission waveform of FIG. 7 (*d*) of the fourth embodiment becomes substantially the same as the light emission waveform of FIG. 4 (*d*) of the first embodiment.

Similarly, the operation timings of the switches SW1*x* through SW4*x* and SW1*y* through SW4*y* shown in FIGS. 7 (*e*) and (*f*) are obtained by changing the order of the operation timings shown in FIGS. 4 (*e*) and (*f*) such that the polarity of the sustaining pulses becomes opposite.

Thus, it is possible to obtain a light emission waveform similar to that of the first embodiment by applying sustaining pulses having phases opposite to those of the sustaining pulses in the first embodiment to the X electrode 31X and the Y electrode 31Y. Therefore, the fourth embodiment also makes it possible to efficiently and stably cause the display cells 33 to emit light while reducing the power consumption and costs of the sustaining circuits 11X, 12X, 11Y, and 12Y.

Fifth Embodiment

Figure 8:
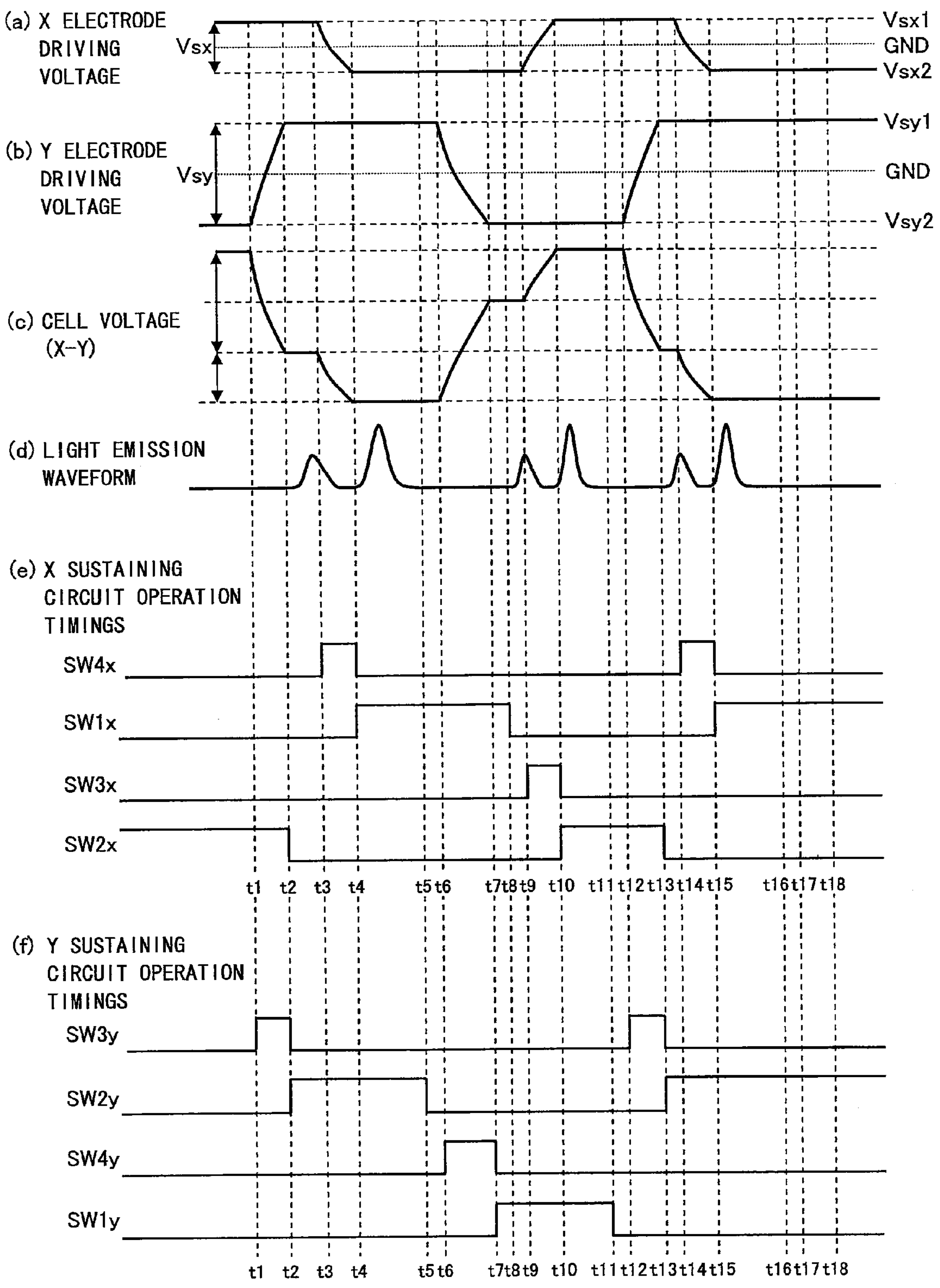
FIG. 8 is a drawing illustrating examples of display electrode driving waveforms and switch operation timings in a plasma display and a plasma display panel driving method according to a fifth embodiment of the present invention.

FIG. 8 is a drawing illustrating examples of driving waveforms applied to the display electrodes (the X electrode 31X and the Y electrode 31Y) and operation timings of the switches SW1*x* through SW4*x* and SW1*y* through SW4*y* in a plasma display and a plasma display panel driving method according to a fifth embodiment of the present invention. Similar to the first through fourth embodiments, FIG. 8 (*a*) shows a driving voltage waveform of the X electrode 31X and FIG. 8 (*b*) shows a driving voltage waveform of the Y electrode 31Y. FIG. 8 (*c*) shows a potential difference obtained by subtracting an electric potential of the Y electrode 31Y from an electric potential of the X electrode 31X. FIG. 8 (*d*) shows a light emission waveform of the display cell 33. FIG. 8 (*e*) shows operation timings of the switches SW1*x* through SW4*x* of the X sustaining circuit 11X, 12X. FIG. 8 (*f*) shows operation timings of the switches SW1*y* through SW4*y* of the Y sustaining circuit 11Y, 12Y. The general configuration of the plasma display of this embodiment is substantially the same as that of the first embodiment shown in FIG. 3 and therefore its description is omitted here.

In the fifth embodiment, driving waveforms have opposite phases to those of the driving waveforms in the second embodiment shown in FIG. 5. In both of the second and fifth embodiments, a low-voltage sustaining pulse with a peak value Vsx is applied to the X electrode 31X and a high-voltage sustaining pulse with a peak value Vsy is applied to the Y electrode 31Y. In the second embodiment, as shown by FIGS. 5 (*a*) and (*b*), the low-voltage sustaining pulse starts to rise from the lowest level Vsx2 to the highest level Vsx1 after a period t1-t3 from the time when the high-voltage sustaining pulse starts to fall from the highest level Vsy1 to the lowest level Vsy2. Meanwhile, in the fourth embodiment, as shown by FIGS. 8 (*a*) and (*b*), the low-voltage sustaining pulse falls from the highest level Vsx1 to the lowest level Vsx2 after a period t1-t3 from the time when the high-voltage sustaining pulse starts to rise from the lowest level Vsy2 to the highest level Vsy1.

Therefore, the polarity of the X electrode 31X and the polarity of the Y electrode 31Y during sustaining discharge in the fifth embodiment are opposite to those in the second embodiment; and the potential difference obtained by subtracting the potential of the Y electrode 31Y from the potential of the X electrode 31X shows a waveform as shown by FIG. 8 (*c*) that is obtained by turning the potential difference waveform of FIG. 5 (*c*) of the second embodiment upside down. Accordingly, the light emission waveform of FIG. 8 (*d*) becomes similar to the light emission waveform of FIG. 5 (*d*) where two-peak discharge occurs twice in one cycle.

Similarly, the operation timings of the switches SW1*x* through SW4*x* and SW1*y* through SW4*y* shown in FIGS. 8 (*e*) and (*f*) are obtained by changing the order of the operation timings shown in FIGS. 5 (*e*) and (*f*).

Thus, in the fifth embodiment, sustaining pulses having phases opposite to those of the sustaining pulses in the second embodiment are applied to the display electrodes. This configuration also makes it possible to efficiently and stably cause the display cells 33 to emit light while reducing the power consumption and costs of the sustaining circuits 11X, 12X, 11Y, and 12Y.

Sixth Embodiment

Figure 9:
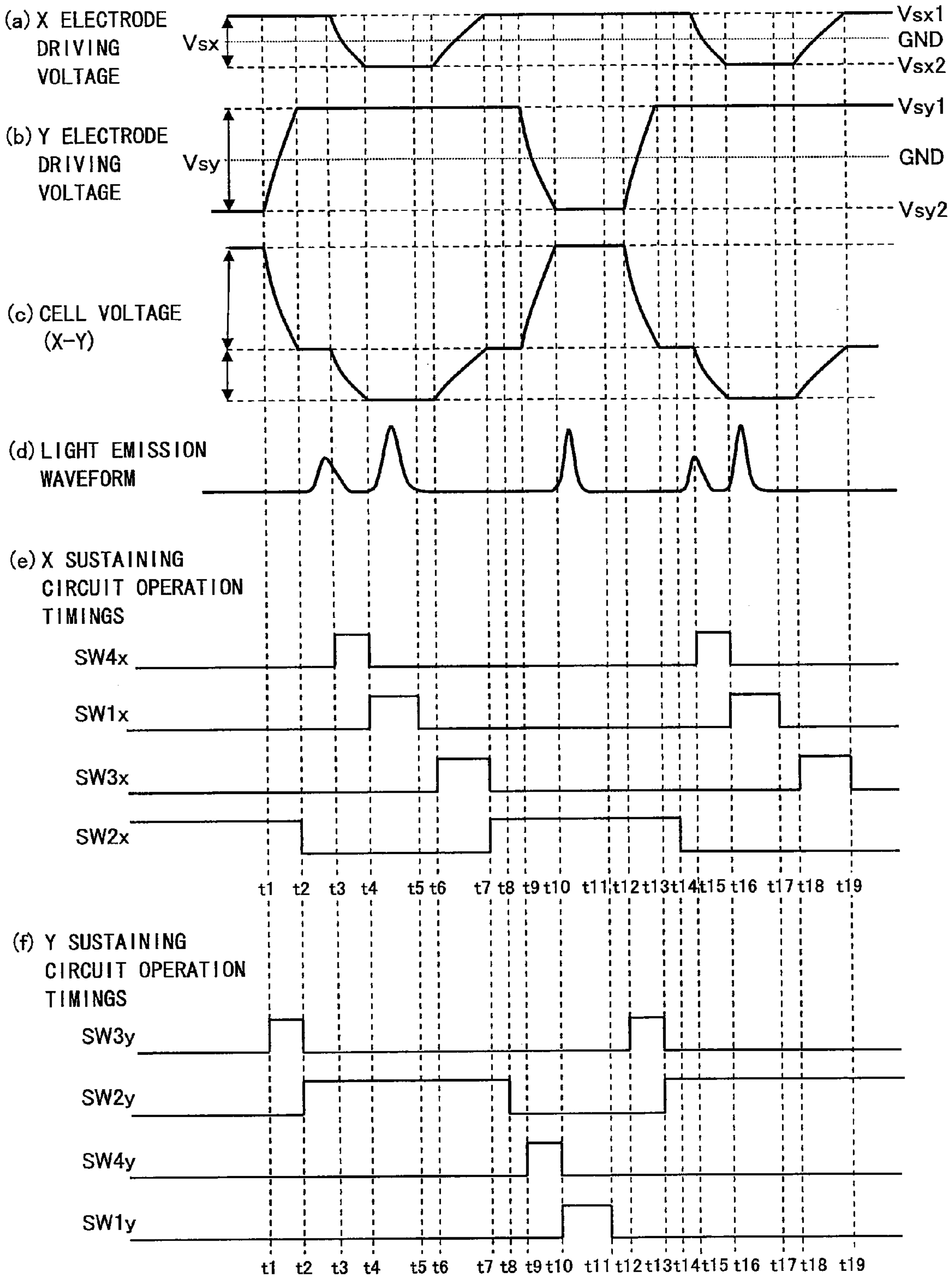
FIG. 9 is a drawing illustrating examples of display electrode driving waveforms and switch operation timings in a plasma display and a plasma display panel driving method according to a sixth embodiment of the present invention.

FIG. 9 is a drawing illustrating examples of driving waveforms applied to the display electrodes (the X electrode 31X and the Y electrode 31Y) and operation timings of the switches SW1*x* through SW4*x* and SW1*y* through SW4*y* in a plasma display and a plasma display panel driving method according to a sixth embodiment of the present invention. Similar to the first through fifth embodiments, FIG. 9 (*a*) shows a driving voltage waveform of the X electrode 31X and FIG. 9 (*b*) shows a driving voltage waveform of the Y electrode 31Y. FIG. 9 (*c*) shows a potential difference obtained by subtracting an electric potential of the Y electrode 31Y from an electric potential of the X electrode 31X. FIG. 9 (*d*) shows a light emission waveform of the display cell 33. FIG. 9 (*e*) shows operation timings of the switches SW1*x* through SW4*x* of the X sustaining circuit 11X, 12X. FIG. 9 (*f*) shows operation timings of the switches SW1*y* through SW4*y* of the Y sustaining circuit 11Y, 12Y. The general configuration of the plasma display of this embodiment is substantially the same as that of the first embodiment shown in FIG. 3 and therefore its description is omitted here.

In the sixth embodiment, sustaining pulses having opposite phases to those of the sustaining pulses in the third embodiment shown in FIG. 6 are applied to the display electrodes 31X and 31Y. In FIGS. 9 (*a*) and (*b*), similar to FIGS. 6 (*a*) and (*b*), a low-voltage sustaining pulse with a peak value Vsx is applied to the X electrode 31X and a high-voltage sustaining pulse with a peak value Vsy is applied to the Y electrode 31Y. However, the polarity of the sustaining pulses in the sixth embodiment is opposite to that of the sustaining pulses in the third embodiment. In other words, in FIGS. 9 (*a*) and (*b*), a concave low-voltage sustaining pulse is applied to the X electrode 31X while a convex high-voltage sustaining pulse is being applied to the Y electrode 31Y. The high-voltage sustaining pulse starts to rise at time t1 from the lowest level Vsy2 to the highest level Vsy1 and the low-voltage sustaining pulse starts to fall from the highest level Vsx1 to the lowest level Vsx2 after a period t1-t3 from the time the high-voltage sustaining pulse starts to rise. Then, while the high-voltage sustaining pulse is maintained at the highest level Vsy1, the low-voltage sustaining pulse rises from the lowest level Vsx2 to the highest level Vsx1. With this configuration, as shown by FIG. 9 (*c*), the potential difference between the display electrodes (the X electrode 31X and the Y electrode 31Y) shows a concave waveform having a step; and as shown by the light emission waveform of FIG. 9 (*d*), two-peak discharge occurs first and then a large one-peak discharge occurs. Although the polarity of the X electrode 31X and the polarity of the Y electrode 31Y are opposite to those in the third embodiment, the light emission waveform of FIG. 9 (*d*) of the sixth embodiment is substantially the same as the light emission waveform of FIG. 6 (*d*) of the third embodiment. Thus, the sixth embodiment makes it possible to cause two-peak discharge and one-peak discharge in one cycle and thereby to efficiently and stably cause the display cell 33 to emit light.

In other words, the plasma display and the plasma display panel driving method of the sixth embodiment make it possible to use a low voltage-resistance circuit for the X sustaining circuit 11X, 12X and thereby make it possible to efficiently and stably cause sustaining discharge while reducing the costs and power consumption of the X sustaining circuit 11X, 12X.

Preferred embodiments of the present invention are described above. However, the present invention is not limited to the specifically disclosed embodiments, and variations and modifications may be made without departing from the scope of the present invention.

In the first through sixth embodiments, a low-voltage sustaining pulse is applied to the X electrode 31X and a high-voltage sustaining pulse is applied to the Y electrode 31Y, and the centers of the peak values (central potentials) of both of the sustaining pulses are set at the ground potential GND. In other words, a sustaining pulse with positive polarity is applied to one of a pair of display electrodes and a sustaining pulse with opposite polarity is applied to the other one of the pair of display electrodes to achieve enough potential difference between the electrodes. Alternatively, for example, the GND level may be set at the panel base potential, and a sustaining pulse and a correction voltage pulse having positive voltages Vsy and Vsx may be used. In this case, the correction voltage pulse is superposed on the sustaining pulse having the same polarity. Also, negative voltages Vsy and Vsx may be used instead. This configuration also makes it possible to form a potential difference waveform between the Y electrode 31Y and the X electrode 31X which is similar to the potential difference waveforms in the first through sixth embodiments. Accordingly, this configuration makes it possible to cause the display cell 33 to emit light in a manner similar to that in the first through sixth embodiments. Thus, a configuration of a plasma display is not limited to that disclosed in the first through sixth embodiments as long as the plasma display is capable of applying sustaining pulses such that the potential difference between the X electrode 31X and the Y electrode 31Y attains a sustaining discharge voltage.

In the first through sixth embodiments, a low-voltage sustaining pulse that cannot cause sustaining discharge by itself is applied to the X electrode 31X and a high-voltage sustaining pulse that can cause sustaining discharge by itself is applied to the Y electrode 31Y. Alternatively, the high-voltage sustaining pulse may be applied to the X electrode 31X and the low-voltage sustaining pulse may be applied to the Y electrode 31Y. In this case, it is possible to use a low voltage-resistance circuit for the Y sustaining circuit 11Y, 12Y and to reduce the costs and power consumption of the Y sustaining circuit 11Y, 12Y.

Further, the present invention may also be applied to a plasma display not employing the ALIS method such as a progressive plasma display.

Thus, aspects of the present invention make it possible to lower the voltage of a sustaining pulse applied to either the X electrodes or the Y electrodes, to use a driving circuit with substantially low voltage-resistance for either the X electrodes or the Y electrodes, and to reduce the power consumption of a driving circuit for the X electrodes or the Y electrodes. These advantages in turn make it possible to reduce the costs of a driving circuit for causing sustaining discharge.

The present invention may be applied to a plasma display including a plasma display panel and a method of driving a plasma display panel.

Aspects of the present invention provide a plasma display and a method of driving a plasma display panel that make it possible to reduce the load and power consumption of a driving circuit and to use a low-cost, low voltage-resistance driving circuit to cause sustaining discharge.

The present application is based on Japanese Priority Application No. 2008-147485, filed on Jun. 4, 2008, the entire contents of which are hereby incorporated herein by reference.

What is claimed is:

1. A plasma display, comprising:

a plasma display panel including cells and display electrodes including a group of X electrodes and a group of Y electrodes;

an X electrode driving circuit configured to apply a sustaining pulse to the group of X electrodes; and a Y electrode driving circuit configured to apply a sustaining pulse to the group of Y electrodes; wherein the X electrode driving circuit and the Y electrode driving circuit are configured to apply the sustaining pulses to the display electrodes to cause sustaining discharge for a number of times corresponding to luminance of the cells to be caused to emit light and thereby to form an image on the plasma display panel;

one of the X electrode driving circuit and the Y electrode driving circuit is configured to apply a low-voltage sustaining pulse with a peak value not large enough to cause the sustaining discharge by itself to a corresponding one of the group of X electrodes and the group of Y electrodes;

the other one of the X electrode driving circuit and the Y electrode driving circuit is configured to apply a high-voltage sustaining pulse with a peak value large enough to cause the sustaining discharge by itself to the other one of the group of X electrodes and the group of Y electrodes; and in a predetermined time period, the X electrode driving circuit and the Y electrode driving circuit are configured to apply the low-voltage sustaining pulse and the high-voltage sustaining pulse at the same time to the corresponding display electrodes.

2. The plasma display as claimed in claim 1, wherein the X electrode driving circuit and the Y electrode driving circuit are configured to apply the low-voltage sustaining pulse and the high-voltage sustaining pulse to the corresponding display electrodes such that the low-voltage sustaining pulse starts to rise after a predetermined period from a time when the high-voltage sustaining pulse starts to fall, or such that the low-voltage sustaining pulse starts to fall after a predetermined period from a time when the high-voltage sustaining pulse starts to rise.

3. The plasma display as claimed in claim 2, wherein a width of the low-voltage sustaining pulse is less than a width of the high-voltage sustaining pulse.

4. The plasma display as claimed in claim 3, wherein each of the X electrode driving circuit and the Y electrode driving circuit includes a power recovery circuit configured to recover power during a rise time and a fall time of the corresponding one of the low-voltage sustaining pulse and the high-voltage sustaining pulse.

5. The plasma display as claimed in claim 4, wherein the X electrode driving circuit and the Y electrode driving circuit are configured to set voltages of the low-voltage sustaining pulse and the high-voltage sustaining pulse such that a first sustaining discharge occurs when a potential difference between the X electrodes and the Y electrodes becomes equal to the peak value of the high-voltage sustaining pulse and a second sustaining discharge occurs when the potential difference becomes equal to a sum of the peak values of the low-voltage sustaining pulse and the high-voltage sustaining pulse.

6. The plasma display as claimed in claim 5, wherein the peak value of the high-voltage sustaining pulse is greater than or equal to two times and less than or equal to four times the peak value of the low-voltage sustaining pulse.

7. The plasma display as claimed in claim 6, wherein the low-voltage sustaining pulse and the high-voltage sustaining pulse have the same central potential.

8. The plasma display as claimed in claim 7, wherein the X electrode driving circuit is configured to apply the low-voltage sustaining pulse to the group of X electrodes and the Y electrode driving circuit is configured to apply the high-voltage sustaining pulse to the group of Y electrodes.

9. A method of driving a plasma display panel including cells and display electrodes including a group of X electrodes and a group of Y electrodes where sustaining pulses are applied to the display electrodes to cause sustaining discharge for a number of times corresponding to luminance of the cells to be caused to emit light and thereby to form an image on the plasma display panel, the method comprising the steps of:

applying a low-voltage sustaining pulse with a peak value not large enough to cause the sustaining discharge by itself to one of the group of X electrodes and the group of Y electrodes; and applying a high-voltage sustaining pulse with a peak value large enough to cause the sustaining discharge by itself to the other one of the group of X electrodes and the group of Y electrodes, wherein in a predetermined time period, the low-voltage sustaining pulse and the high-voltage sustaining pulse are applied at the same time to the corresponding display electrodes.

10. The method as claimed in claim 9, wherein the low-voltage sustaining pulse and the high-voltage sustaining pulse are applied to the display electrodes such that the low-voltage sustaining pulse starts to rise after a predetermined period from a time when the high-voltage sustaining pulse starts to fall, or such that the low-voltage sustaining pulse starts to fall after a predetermined period from a time when the high-voltage sustaining pulse starts to rise.

11. The method as claimed in claim 10, wherein a width of the low-voltage sustaining pulse is less than a width of the high-voltage sustaining pulse.

12. The method as claimed in claim 11, wherein the low-voltage sustaining pulse and the high-voltage sustaining pulse are applied to the display electrodes such that LC resonance occurs during a rise time and a fall time of the low-voltage sustaining pulse and the high-voltage sustaining pulse when power is recovered.

13. The method as claimed in claim 12, wherein voltages of the low-voltage sustaining pulse and the high-voltage sustaining pulse are set such that a first sustaining discharge occurs when a potential difference between the X electrodes and the Y electrodes becomes equal to the peak value of the high-voltage sustaining pulse and a second sustaining discharge occurs when the potential difference becomes equal to a sum of the peak values of the low-voltage sustaining pulse and the high-voltage sustaining pulse.

14. The method as claimed in claim 13, wherein the peak value of the high-voltage sustaining pulse is greater than or equal to two times and less than or equal to four times the peak value of the low-voltage sustaining pulse.

15. The method as claimed in claim 14, wherein the low-voltage sustaining pulse and the high-voltage sustaining pulse have the same central potential.

16. The method as claimed in claim 15, wherein the low-voltage sustaining pulse is applied to the group of X electrodes and the high-voltage sustaining pulse is applied to the group of Y electrodes.

* * * * *